United States Patent [19]
Rabo et al.

[11] Patent Number: 5,013,193
[45] Date of Patent: May 7, 1991

[54] CLOSET FLANGE REBORING TOOL

[76] Inventors: Frederick N. Rabo, 2120 Oro-Chico Hwy., Durham, Calif. 95938; Steven J. Masonek, 7475 Cana Hwy., Chico, Calif. 95926

[21] Appl. No.: 551,279

[22] Filed: Jul. 12, 1990

[51] Int. Cl.$^5$ .................. B23B 45/14; B23B 51/00
[52] U.S. Cl. ........................ 408/201; 30/500; 408/82; 408/196; 408/209; 408/225
[58] Field of Search ............. 408/82, 196, 201, 225, 408/227, 713, 233, 239 R, 80, 81, 83, 83.5, 209; 30/172, 500

[56] References Cited
U.S. PATENT DOCUMENTS

| | | | |
|---|---|---|---|
| 1,460,838 | 7/1923 | Bean | 408/233 X |
| 1,625,836 | 4/1927 | Tanguay | 408/227 X |
| 3,795,160 | 3/1974 | Janiszewski | 408/82 X |
| 3,799,688 | 3/1974 | Lomax et al. | 408/196 |
| 4,580,934 | 4/1986 | McCormick | 408/227 X |
| 4,693,643 | 9/1987 | Heyworth | 408/82 |
| 4,720,219 | 1/1988 | Masonek et al. | 408/201 |
| 4,975,001 | 12/1990 | Rabo et al. | 408/201 X |

*Primary Examiner*—Steven C. Bishop

[57] ABSTRACT

A plastic closet flange reboring tool having an elongated arbor, a cutting member and two exchangeable non-circular guide members. The arbor having a first end structured of a D-shaped threaded extension, and a second end structured for releasable connection to a rotatable tool chuck. The cutting member is generally concavo-convex in structure with the guide member being generally rectangular and flat with rounded terminal ends. Both the cutting member and guide member have central D-shaped apertures sized for receiving the D-shaped threaded extension of the arbor. Both the cutting member and guide member are releasably adjustably retained on the D-shaped threaded extension of the arbor with threaded nuts.

9 Claims, 8 Drawing Sheets

CLOSET FLANGE REBORING TOOL

BACKGROUND OF THE INVENTION

1. Field of the Invention

This invention relates to reboring tools useful for removing used or damaged plastic pipe fittings from pipes, or plastic pipe from within the fittings. The present invention is particularly directed towards an arbor, centering guide member and cutting head member for structured specifically for removing a plastic closet flange fitting for a toilet from a plastic waste pipe.

2. Description of the Prior Art

In the plumbing industry, when installing water closets or toilets, a closet flange is affixed at floor level to the drainage pipe below floor level to allow bolt-on attachment and sealing of the toilet to the waste line. Closet flanges basically consist of a short tubular hub for attachment to a waste pipe, and an upper outer extending flange attached to the top end of the hub having bolt apertures therein. Today many closet flanges and drainage waste pipes are manufactured of ABS plastic and are permanently bonded together with adhesives at the construction site. While plastic is less expensive and lighter in weight than metal, it may occasionally becomes irreparably damaged, generally during construction of the building before installaton of the toilets. Since the closet flange is permanently affixed to the drainage pipe, and since the hub of the closet flange is recessed below the concrete slab or wooden flooring of the building, replacement of the damaged closet flange has traditionally included removal of a relatively large portion of the flooring surrounding the flange to allow the flange to be cut off the pipe with a hacksaw. Up to now, no portable equipment of tooling has been available which could efficiently remove by reboring the damaged closet flange, without disturbing the flooring, and leave the remaining drainage pipe in suitable condition for refitting with a new closet flange. Conventional twist-type drill bits, augers, spade bits and fly cutters are not suited for reboring a closet flange since they rely on a centering point to engage a solid material to steady and direct the cutting edges.

A past art patent search was conducted at the U.S. Patent Office to examine reboring tools capable of removing installed plastic closet flanges from plastic drainage pipes. Of the past art patents examined, those considered somewhat relevant to our invention are as follows:

R. Bean was issued U.S. Pat. No. 1,460,838, on Jul. 3, 1923, for a refacing tool used to reseat or reface the valve seats of internal combustion engines.

A. G. Tanguay was granted U.S. PAT. No. 1,625,836, on Apr. 26, 1927, for a cutting bit comprised of a concavo-convex disc. This disc alone is incapable of reboring a closet flange without the additional elements of a support shaft and a guide member, neither of which has been mentioned or shown.

A U.S. Pat. No. 4,580,934, was issued to W. W. McCormick, on Apr. 8, 1986, for a hole sizing tool for accurately enlarging the size of a previously drilled hole. The tool includes a mandrel, an annular cutting disc, and an annular pilot member and a shank.

On Sept. 15, 1987, M. Heyworth was granted U.S. Pat. No. 4,693,643, for a plastic pipe planing device. The device includes a cylindrical pilot which supports a number of cutting blades and contains a centrally affixed drive shaft.

Also of interest is our own U.S. patent on a reboring tool, U.S. Pat. No. 4,720,219, issued to S. Masonek and F. Rabo, on Jan. 19, 1988, which includes the use of a circular centering guide disc.

The previously mentioned past art patents generally include pilot or guide discs which are circular in shape and therefore could not be used as a centering guide with plastic closet flanges due to the structure of the interior of the flange. The closet flange essentially has three different internal bore diameters, with the narrowest diameter formed by an inward projecting ridge at the top end of the tubular hub of the flange. In order to position the pilot or centering guides of the past art devices down into the lower, larger diameter bore of the hub of the closet flange, the centering guides would have to first be passed through the smaller diameter cylindrical bore at the top of the hub, which is essentially impossible with a circular or annular member, and have the circular guide disc function as a centering guide in the larger diameter cylindrical bore of the hub of the closet flange. If the circular centering guides were sized sufficiently small enough to pass through the narrow cylindrical bore at the top of the hub, they would be too small for bracing against the interior annular wall of the hub, and would be ineffective as centering guides for a bore tool. Therefore, none of the past art devices can effectively remove damaged closet flange from a connect waste pipe.

SUMMARY OF THE INVENTION

The present invention provides a reboring tool specifically structured for removing plastic closet flanges from installed plastic drainage pipes. Our reboring tool is comprised of an elongated partially threaded shank or arbor to which is a removably affixed cutting head member and a non-circular centering guide member. The guide member is provided in a short, and a long version for accommodating the two different diameters of drainage pipes commonly used in combination with plastic closet flanges. One size of drainage pipe has both a smaller internal and external diameter allowing the hub of the closet flange to be positioned over the outside of the pipe, with the pipe bottoming out against the reduced diameter cylindrical flange or ridge within the top of the hub. This first pipe size is considered 3" nominally sized pipe. The second drainage pipe is 4" nominally sized, having a larger internal and external diameter that the 3" pipe. With 4" nominal waste pipe, the hub of the closet flange is placed inside the interior of the pipe. It should be noted that there are commonly used transitional bell shaped adapters for making a transition from a 3" nominal waste line to fitting over the exterior of the hub of the closet flange. For the purpose of this disclosure, and for use and structure of our tool for that matter, this arrangement of 3" nominally sized pipe and a transitional bell adaptor is identical to the use of 4" nominal pipe fitted over the exterior of the hub of the closet flange. Most plastic closet flanges manufactured today are made to be used with either 3" or 4" nominally sized ABS or PVC plastic waste lines, with a single closet flange being useful for either pipe size depending on the choice of the plumber.

Our centering guide member is basically a rectangular flat die stamped plate having rounded ends, with the length of the longer version of guide member sized for placement into, and being of a length to generally span between and ride against the interior annular wall of the hub of the closet flange with the closet flange affixed within the interior of a 4" nominal pipe or bell adaptor fitting. The shorter or smaller sized guide member is sized for placement inside the 3" nominal pipe when the pipe is affixed within the interior of the hub of the closet flange. A single size of cutting head member will function with either pipe size in combination with a closet flange.

Our cutting head member and centering guide members are structured to allow selective stationary affixment against linear movement along the length of the arbor, allowing adjustments in the spacing between the two members, and the space at which the two members are affixed relative to the ends of the arbor. Our cutting member and guide member are also prevented from rotating independent of the arbor during cutting, although our guide member could be allowed to rotate independent of the arbor during cutting without adversely effecting the function of our tool.

For removing a closet flange with the hub thereof affixed within a 4" nominal pipe or 3" to 4" bell adaptor fitting, our longer or larger size guide member is affixed to the lower threaded end of the arbor, while our cutting member is lifted up beyond the threads of the arbor to a reduced diameter area of the arbor having no threads. The cutting member is manually held in the upper end of the reduced section of the arbor, next to the drill chuck attachment end thereof, while the guide member is lowered into the hollow interior of the hub of the closet flange at a relatively sharp angle to thread the guide member beyond the reduced interior diameter ridge at the top end of the hub of the closet flange. Once the non-circular guide member is positioned within the major interior diameter of the hub, the arbor is positioned vertically, positioning the guide member horizontally and generally spanning the interior diameter of the hub. The cutting member is then lowered onto the threaded portion of the arbor and fixed in position with nuts above the reduced interior diameter ridge of the closet flange. The cutting member should be positioned as close to the top surface of the flange as possible, and the guide member should be positioned as close as possible to the underside of the interior ridge of the closet flange to provide the maximum length of guidance prior to the guide member moving beyond the lower end of the hub. The chuck attachment end of the arbor can be affixed to an electric drill or a hand brace, to supply the power for rotating the cutting member. As the rotating cutting member is advanced, the hub of the closet flange is cut away, leaving the larger diameter drainage pipe removable, as the diameter of the cutting member is substantially equal to that of the exterior diameter of the hub of the closet flange and the interior diameter of the 4" nominal pipe or the 4" section of the bell adaptor fitting. A new closet flange can now be installed into the interior of the un-damaged 4" drainage pipe or transitional bell adaptor fitting.

Our longer centering guide member used for removing a closet flange from a 4" nominal pipe is less than circular in shape in order to be able to be angled and threaded in through the small first diameter of the closet flange and to then be positioned horizontally and generally span between and be placed against two points of the internal wall of the larger diameter bore within the hub of the flange. A wide variety of different shaped plates will function as this less than circular guide member, and we anticipate same type of collapsible and expandable guide disc could also be devised to perform our guide member function, with the collapsing of this anticipated disc most likely rendering the guide disc with a non-circular shape at least for a moment.

If a 3" nominal pipe is affixed within the hub of a closet flange, the smaller or shorter guide member is used, but again, the same size of cutting member may be used as with the 4" pipe size. When removing a closet flange from a 3" pipe, both the closet flange hub and the more inward positioned drainage pipe are cut away, made possible by the cutting blades of our cutting member extending inward toward our centered arbor sufficiently to also cut the more inwardly positioned 3" waste pipe. After the closet flange has been removed from the 3" pipe, a coupler can be fitted over the exterior of the now shortened remaining pipe, and a short piece of 3" pipe is inserted into the upper end of the coupler to bring the 3" pipe back up to a proper elevation. A new closet flange is then installed over the exterior of the pipe. The use of the 3" pipe into the interior of the hub of the closet flange appears to be less common than the use of a 4" pipe or a 3" to 4" nominally sized bell adaptor and 3" pipe.

Our unique structure of the centering guide member, along with the adjustable attachment of both the guide member and the cutting head member to the arbor, allows the guide member to be passed through the narrow internal ridge of the closet flange, yet still be of sufficient size to abut the internal annular sidewall of the flange hub, and effectively serve as a centering guide and stabilizer for the cutting head member. This invention therefore saves a great deal of time, money, and effort when replacing damaged plastic closet flanges. Surrounding flooring is also saved from disruption. Our preferred structure of the invention is also very inexpensive to manufacture since the cutting head member and centering guide member are items which are structured to be made of a single piece of metal die cut and die formed from a large metal sheet.

Therefore, a primary object of the invention is to provide a closet flange reboring tool which can easily and quickly remove installed plastic closet flanges from plastic drainage pipes.

A further object of the invention is to provide the above in a closet flange reboring tool which can be powered by a motor powered drill or hand drill.

An even further object of the invention is to provide the above in a closet flange reboring tool which eliminates the disruption of the surrounding flooring for removal of the closet flange from the pipe.

A still further object of the invention is to provide the above in a closet flange reboring tool which is durable and very inexpensive to manufacture.

An even further object of the invention is to provide the above in a reboring tool useful for all of the typically used waste pipe sizes and fittings used in direct association with the installation of plastic closet flanges.

A still further object of the invention is to provide the above in a closet flange reboring tool which includes a centering guide member which is shaped and sized for insertion first through a small diameter bore at the top of the hub of a closet flange, and may then be placed horizontally within a larger diameter bore of the hub below the smaller diameter with the horizontal placement of the guide member placing the guide member generally spanning the major internal diameter of the hub to serve as an effective centering guide during cutting.

Other objects and advantages of the invention will become apparent with examination of the remaining specification and accompanying drawings.

DESCRIPTION OF THE PREFERRED EMBODIMENT

Figure 1:
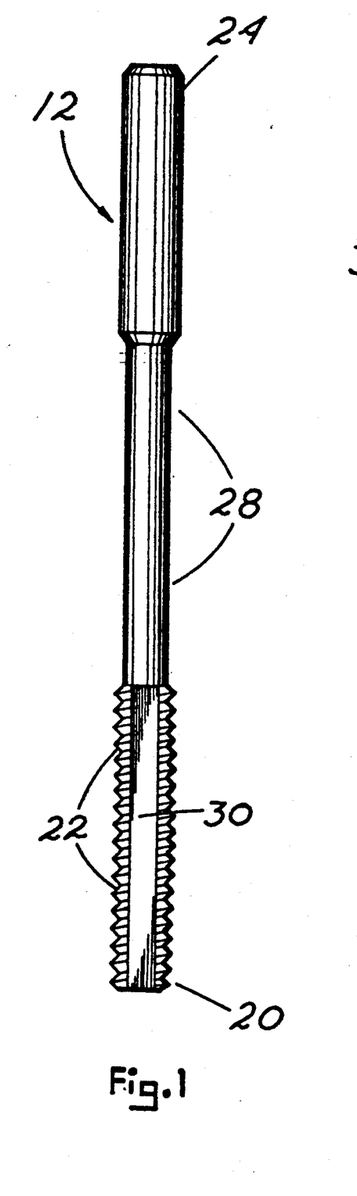
FIG. 1 is a side view of our arbor showing the partial threads, an elongated vertical un-threaded area between the threads of the arbor giving the arbor a D-shaped cross-section, and the reduced diameter of the arbor above the threaded area adjacent the drill chuck connection end of the arbor.
Figure 2:
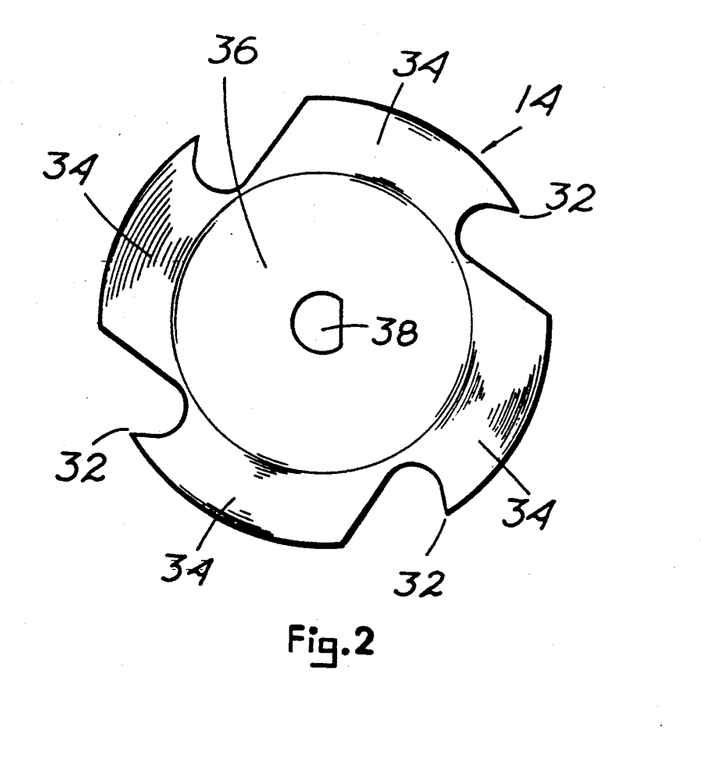
FIG. 2 is a top view of our die cut and die formed concavo-convex disc shaped cutting head member formed of a single piece of steel.
Figure 3:
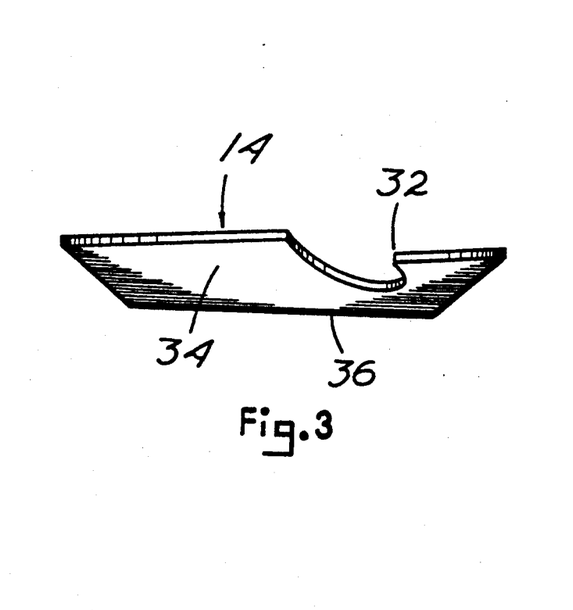
FIG. 3 is a side view of our cutting member showing the concavo-convex shape thereof.
Figure 8:
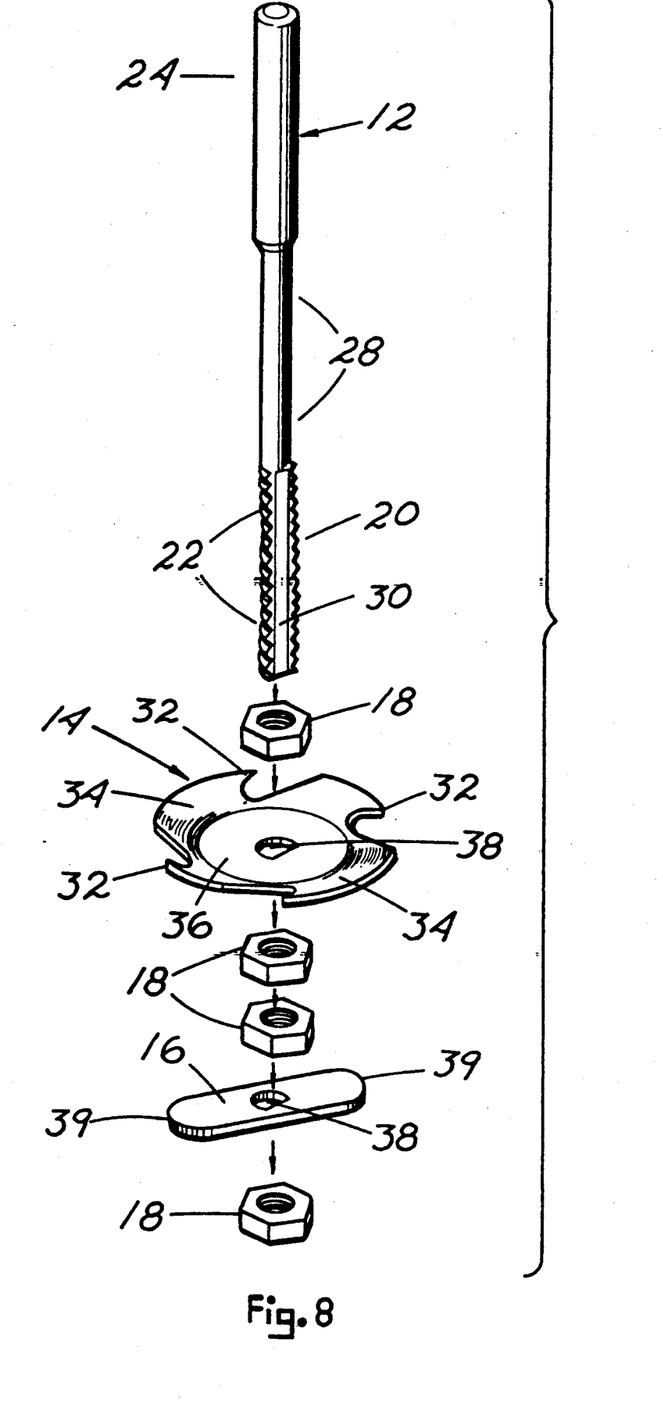
FIG. 8 is an exploded perspective view of the preferred component parts of the invention in their relative position of assembly.

Referring now to the drawings where the preferred structure of our invention is generally designated reboring tool 10, and shown best, although disassembled, in drawing FIG. 8. Reboring tool 10 is comprised of arbor 12, cutting member 14, non-circular centering guide member 16, and four threaded nuts 18. Guide member 16 generally designate either size guide member. Arbor 12, depicted in FIG. 1, is an elongated generally cylindrical shaft preferably of steel, having a lower or first end 20 having threads 22 thereon, and an oppositely disposed upper or second end 24 serving as an attachment end for a rotatable chuck 26 of a tool such as a drill motor or hand brace. A reduced diameter central portion of arbor 12, designated reduced area 28, is sized smaller in diameter than first end 20, and may also be sized smaller than second end 24 as shown in the drawing figures. The threaded section of arbor 12 at first end 20 desirably occupies about two or three inches, or approximately one forth of the arbor 12 length, while reduced area 28 occupies the remainder of the length of arbor 12 to the enlarged arbor second end 24. First end 20, with threads 22, is a D-shaped extension of arbor 12 where the right handed threads 22 run along only a portion of first end 20, leaving a flat unthreaded lengthwise surface area designated planar surface 30. Threads 22 and planar surface 30 provide this portion of arbor 12 with a D-shaped cross-section. Second end 24 being desirably enlarged in diameter over reduced area 28, when enlarged serves as an abutment shoulder to prevent inadvertent removal of cutting member 14 and nuts 18 from that end, but, in any case serves as a chuck attachment area, and may further have one or more flattened sides to prevent rotation of arbor 12 in tool chuck 26. Cutting member 14 is generally a circular, concavo-convex metal structure having a plurality of inherent cutting blades 32 incorporated into the upwardly curved outer sidewalls 34 thereof. Cutting blades 32 are primarily structured from cut out areas of sidewalls 34 with cutting blades 32 being sharpened edges thereof which angle slightly outward beyond sidewalls 34. A flat central area of cutting member 14, designated base 36, contains a central D-shaped attachment aperture 38 sized and structured for placement over first end 20 of arbor 12. The D-shaped attachment aperture 38 prevents cutting member 14 from rotating in the threaded area 20 independent of arbor 12 in use. Cutting member 14 is preferably die cut and die formed from a single piece of steel sheet metal for durability and economic reasons.

Figure 4:
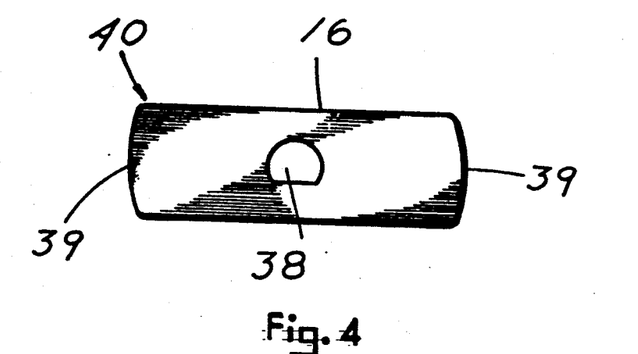
FIG. 4 is a top view of our larger or longer non-circular centering guide member.
Figure 5:
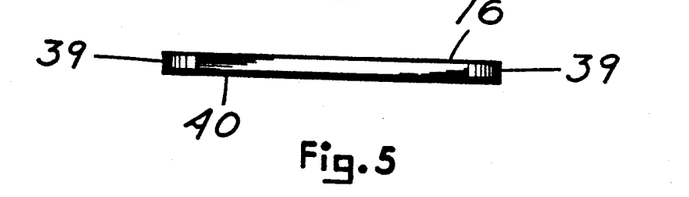
FIG. 5 is a side view thereof.
Figure 6:
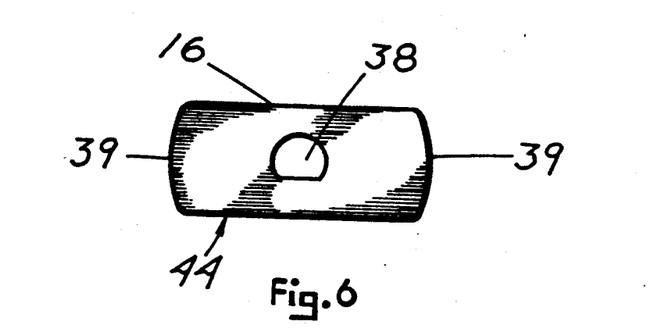
FIG. 6 is a top view of our smaller or shorter non-circular centering guide member.
Figure 7:
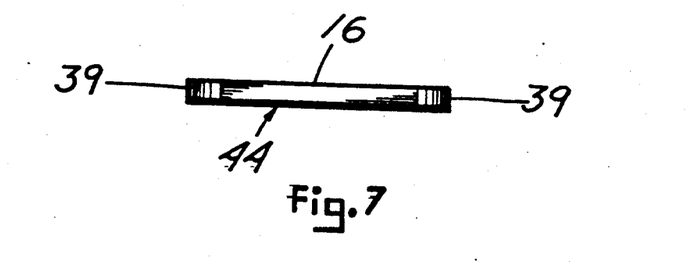
FIG. 7 is a side view thereof.

Guide member 16 is a flat elongated rectangular metal plate having two oppositely disposed rounded ends 39 and a central attachment D-shaped aperture 38 similar to that of cutting member 14. The length of guide member 16 between ends 39 is longer than the width thereof as may be seen in FIG. 4 and 6, providing guide member 16 with a non-circular shape. As may be seen in FIGS. 5 and 7, guide member 16 is quite thin, although it could be thicker, additional thickness would only consume extra metal. Rounded ends 39 are desirably structured with a specific radius sized for correlating with specifically sized interior diameters of various structures.

There are two sizes of guide members 16 herein provided, the first being the longer or larger first guide member 40, sized for horizontal positioning in the interior of the hub 47 of closet flange 42, which will be described later. The second guide member 44 is sized smaller or shorter than the first, and is structured for horizontal positioning within the interior of smaller 3" drainage pipe 46, also to be discussed later. Guide member 16 is also preferably die cut and die formed from a single piece of steel sheet metal on a punch-press for economic reasons.

Closet flange 42 is illustrated in this application comprised of plastic, consisting of a short cylindrical hollow hub 47 having a horizontal outward projecting attachment flange or rim 50 at what is considered the top of closet flange 42. Attachment rim 50 contains a number of bolt apertures for releasable connection of a water closet or toilet. Attachment rim 50 is generally positioned flush or slightly above the surface of the flooring, whether it be wooden or concrete flooring. Hub 47 being a hollow annular structure has an outer annular surface or sidewall 48 defining its outer diameter, and an interior surface or sidewall 58 defining its interior open diameter or bore, and is usually two or three inches in length from rim 50 to the oppositely disposed bottom end of hub 47. Cutting member 14 is generally equal in diameter to that of the exterior diameter of annular hub 47, enabling the complete cutting away of hub 47 without damaging a pipe 60 or adaptor fitting placed over the outside of hub 47.

Closet flange 42 basically has three different interior diameters. The first or upper diameter is referred to as wax ring receiver 54, and is a shallow annular cavity defined on the upper edge by the horizontal top of attachment rim 50, and on the bottom edge by the upper side of abutment ridge 56. Abutment ridge 56 is an annular ridge projecting inward from the interior of closet flange 42, generally dividing wax ring receiver 54 and hub 47, and defining a narrow annular bore therebetween. Ridge 56 helps to prevent the wax ring, which is inserted into wax ring receiver 54 upon installation of the toilet, from falling into the interior hub 47, and also helps to provide an abutment surface when the toilet is pressed against the wax ring to provide a watertight seal. Ridge 56 defines a second interior diameter of closet flange 42. The third internal diameter of closet flange 42 is the internal diameter of the bore of hub 47 below ridge 56, and is slightly smaller in diameter than wax ring receiver 54, but larger in diameter than the narrow bore defined by ridge 56. The interior diameter of hub 47 is sized to receive small drainage pipe 46, while the exterior diameter of hub 47 is sized to fit within 4" nominal drainage pipe 60 and any 4" nominally sized adaptor fittings. When installed, a pipe 46 or 60 is permanently bonded with glue to one closet flange 42.

Figure 9:
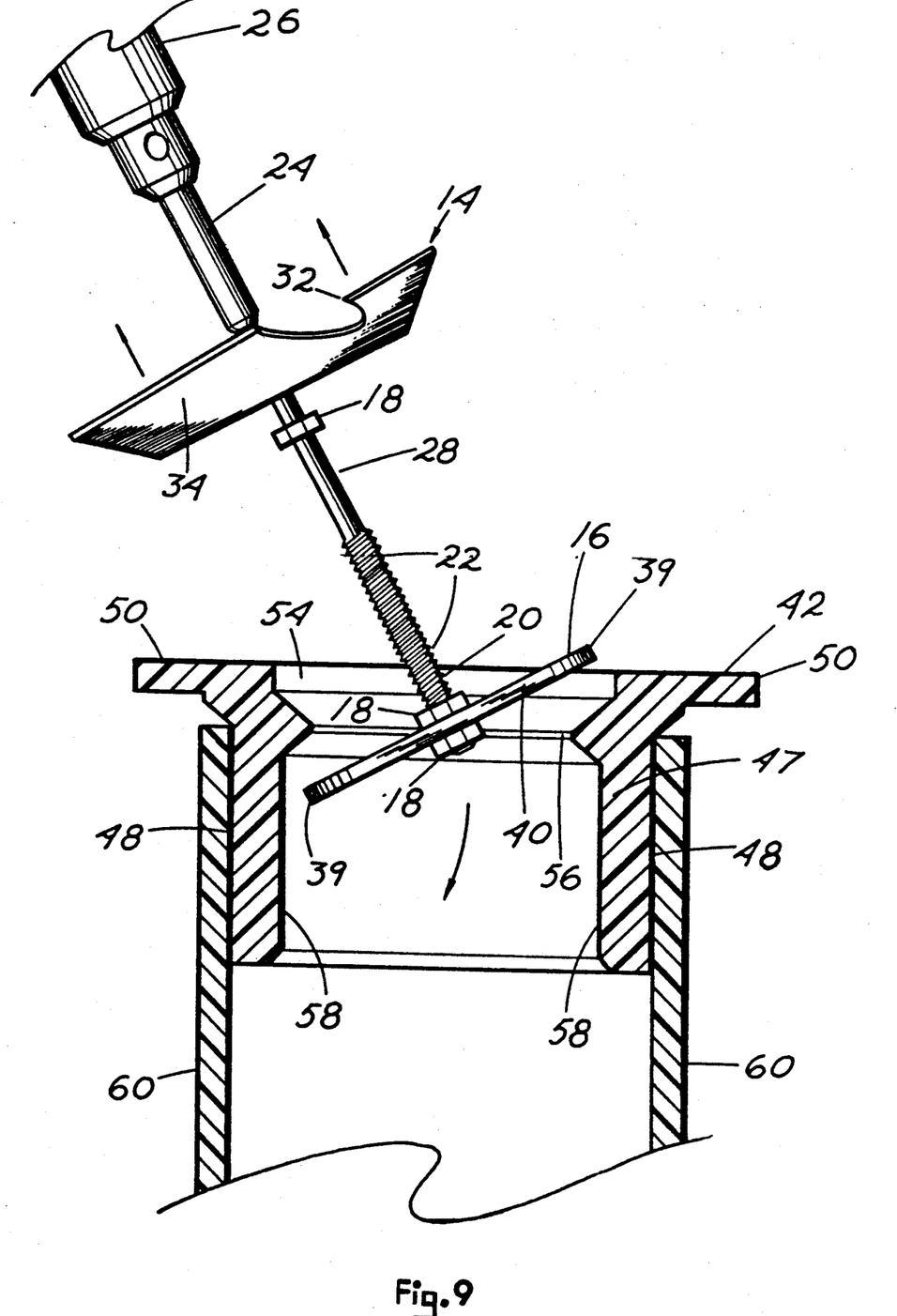
FIG. 9 is a cross-sectional side view of a closet flange affixed to a 4" nominally sized drainage pipe or fitting. Also shown is our longer centering guide member in the process of being angled beyond the reduced diameter interior ridge of the closet flanged. The cutting member is shown elevated on the upper end of the arbor to allow for sufficient angling of the arbor and guide member.

In use, one nut 18 is threaded onto first end 20 of arbor 12 and advanced up by rotating and then sliding to reduced area 28, where the nut 18 can slide freely. Nut 18 is allowed to slide freely due to the fact that reduced area 28 has a smaller exterior diameter than the interior diameter of nut 18. Next, cutting member 14 is fitted over first end 20 of arbor 12, concave side upward toward arbor end 24, with planar surface 30 aligned with the flat edge of attachment aperture 38. The D-shaped aperture 38 in cutting member 14, or guide member 16 for that matter, is sufficiently large to allow linear sliding of arbor end 20 through aperture 38 providing the flat spot of aperture 38 is aligned with planer surface 30 of arbor 12. Cutting member 14 is positioned upward into reduced area 28 adjacent the first nut 18, where cutting member 14 also slides freely. Although threads 22 could be extended upward to second end 24, reduced area 28, being smaller than D-shaped apertures 38 and the internal bore diameter of nuts 18, allows nuts 18 and cutting member 14 to be quickly slid upward toward arbor end 24 once they are above threads 22. A second nut 18 is then threaded over first end 20 and positioned adjacent the bottom side cutting member 14. A third nut 18 is threaded onto first end 20 and left engaged with threads 22, followed by guide member 16, and finally the fourth nut 18. Guide member 16 is positioned over arbor 12 adjacent first end 20 and fixed stationary, sandwiched between two tightened nuts 18. Second end 24 of arbor 12 is preferably affixed at this time, or even earlier, to rotatable chuck 26 of a tool, which can be powered by any suitable means including an electric hand drill, or a manual hand brace. First end 20, with affixed guide member 16, is then lowered into the interior of closet flange 42. As first end 20 of arbor 12 is inserted into wax ring receiver 54, arbor 12 is positioned at a steep angle, positioning one end 39 of guide member 16 angled upward with the lower end 39 under abutment ridge 56 within hub 47, as shown in FIG. 9. Cutting member 14, along with two nuts 18, are manually retained by the user's fingers on the upper end of reduced area 28, toward second end 24, to allow sufficient space for the steep angling of arbor 12. This tipping in combination with the size and shape of guide member 16 allows passage of the longest portion of guide member 16 beyond the smaller diameter abutment ridge 56. Once guide member 16 is beyond abutment ridge 56, arbor 12 is vertically positioned, thereby positioning guide member 16 horizontally and abutting sidewall 58 of hub 47 preferably on at least two points. It should be noted that actual abutment of both ends 39 at any given instant are not an absolute requirement so long as guide member 16 is in sufficient close proximity during rotation to the interior sidewall of hub 47 to serve as an effective centering guide when operating the tool 10.

Figure 10:
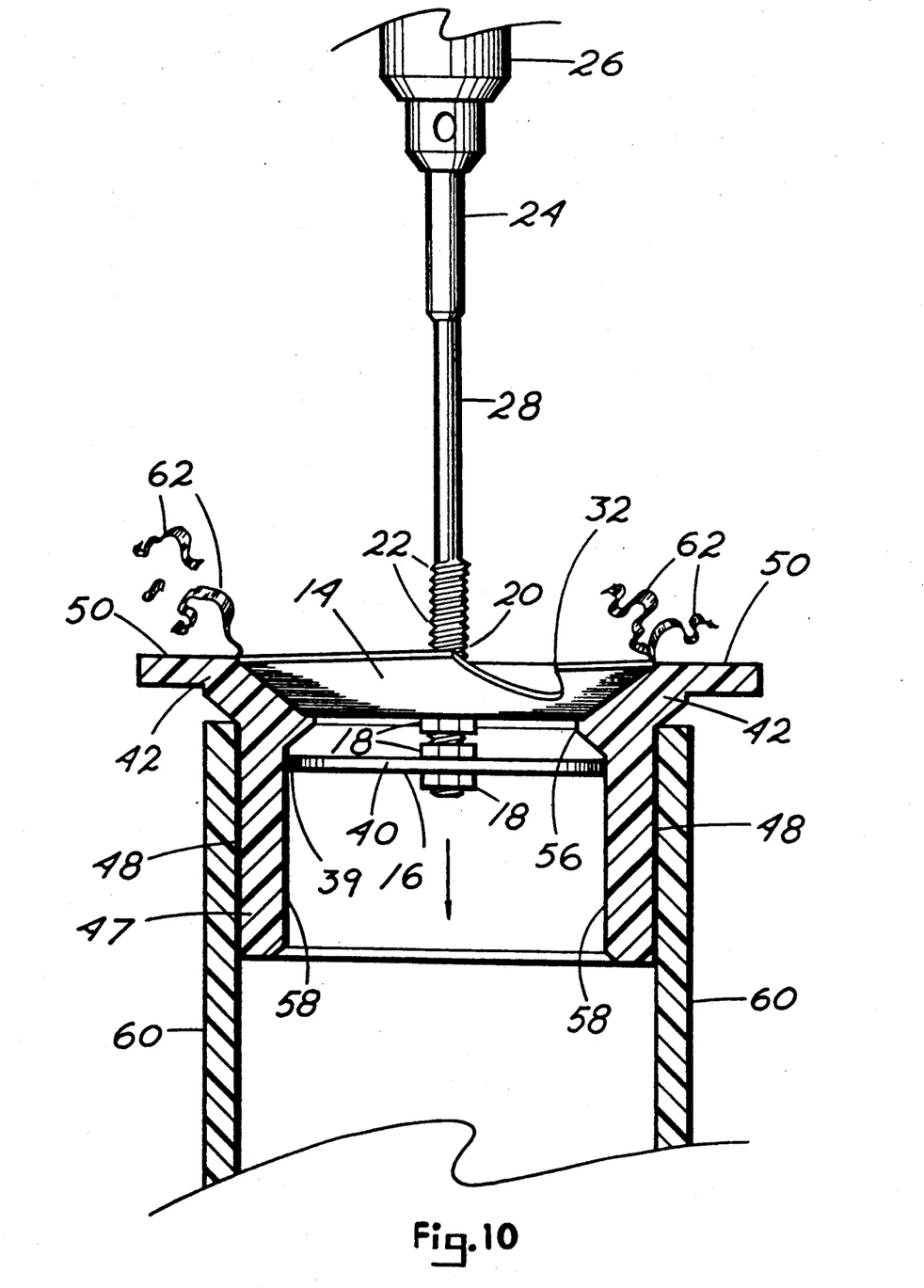
FIG. 10 is a cross-sectional side view of the closet flange affixed within the 4" nominally sized drainage pipe, showing the cutting member repositioned and stabilized on the arbor adjacent the guide member. The cutting member is shown beginning the process of cutting away the closet flange.
Figure 11:
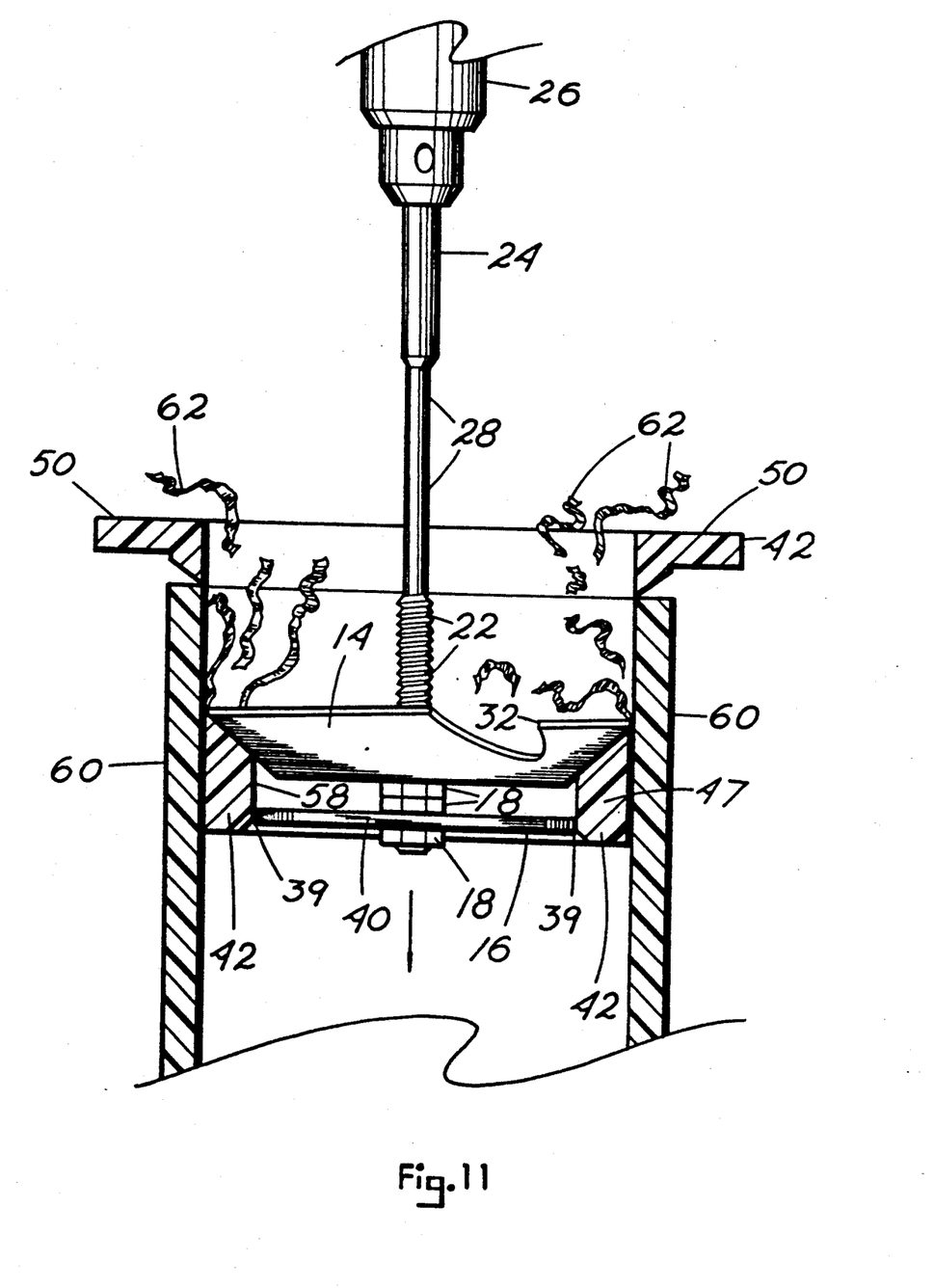
FIG. 11 is a cross-sectional side view of the closet flange affixed to the 4" nominally sized drainage pipe, showing the hub of the closet flange almost completely removed. The guide member is about to move downward beyond the hub of the closet flange, however, a skilled artisan will at this point be able to finish the reboring process of the last quarter inch or so without the effect of a centering guide due to the fact that any scoring of annular wall of the pipe that far downward will not have an adverse effect.

In FIG. 9, 10 and 11, closet flange 42 is shown affixed to large drainage pipe 60, with arbor 12 affixed with first guide member 40. The terminal rounded ends 39 of first guide member 40 are sized to span and abut the interior wall 58 of hub 47. Cutting member 14 is then lowered over threads 22 of first end 20, and secured against moving upward and downward on arbor 12 with nuts 18, and then cutting member 14 is positioned as close as possible to the top edge of abutment ridge 56 with guide member 16 positioned as close as is possible to the underside of ridge 56. Power can now be supplied to rotate arbor 12 and begin the cutting process, as shown in FIG. 10. The D-shaped cross-section of arbor 12 and the properly sized and shaped D-shaped aperture through cutting member 14 prevent member 14 from rotating independent of arbor 12. As cutting blades 32 of cutting member 14 rotate, blades 32 engage closet flange 42 and carve off small portions of plastic referred to as shavings 62. First guide member 40 steadies and guides cutting member 14 generally vertically so that cutting member 14 accurately shaves away ridge 56 and hub 47, as shown in FIG. 11, leaving only the outer edge of attachment flange or rim 50, which can be easily lifted away. Most of the debris and shavings 62 created from closet flange 42 are thrown upward and accumulate on the interior concave surface of cutting member 14, where they can be lifted out with the removal of reboring tool 10. Any shavings 62 which may inadvertently fall into drainage pipe 46 or 60 will not harm the drainage system.

Figure 12:
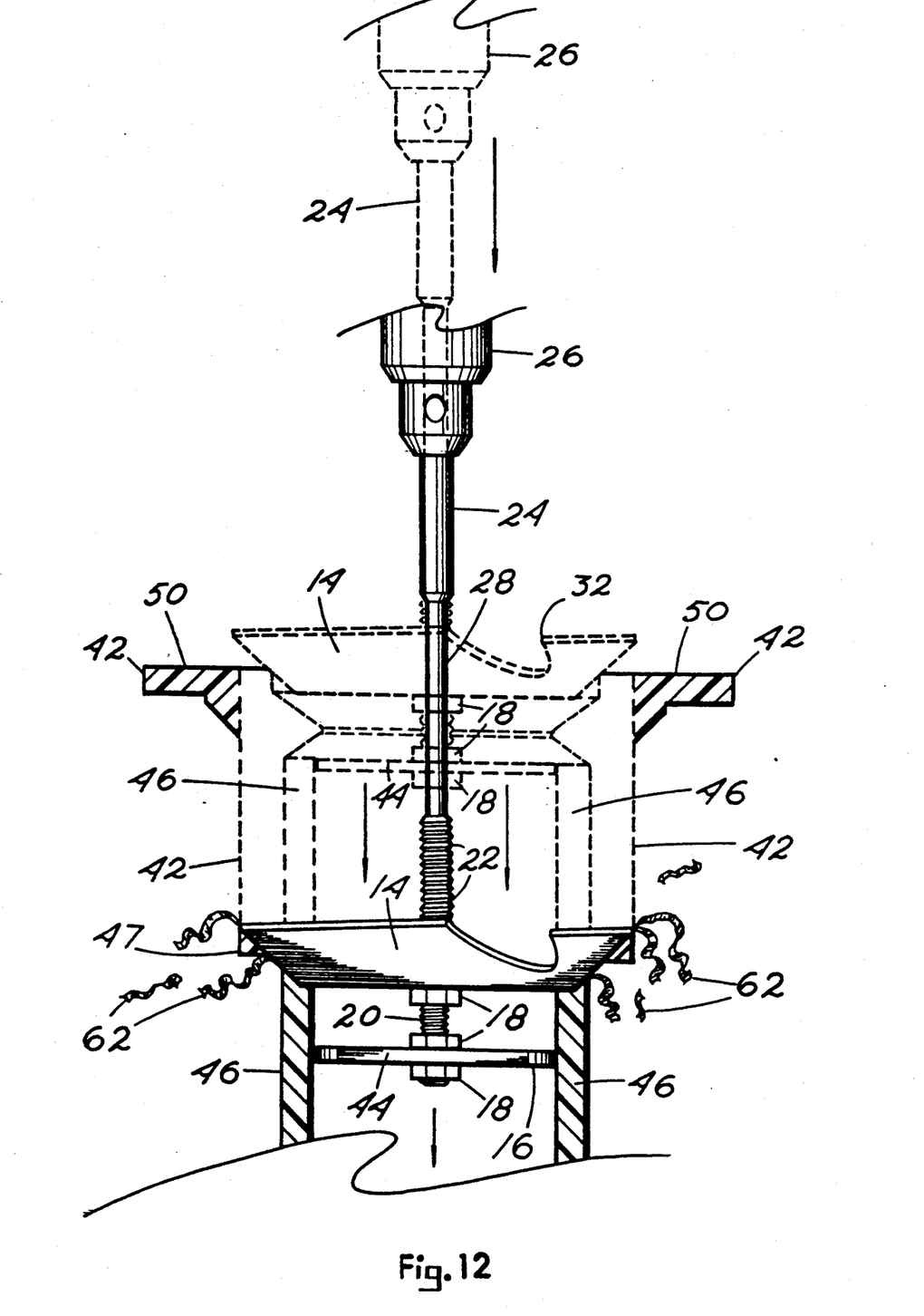
FIG. 12 is a cross-sectional side view of a closet flange affixed over a 3" nominally sized drainage pipe, showing both the closet flange and upper section of the pipe in the process of being removed by cutting.

When closet flange 42 is affixed to small drainage pipe 46, as shown in FIG. 12, first guide member 40 is replaced with the smaller second guide member 44, but the same size of cutting member 14 may be used. The smaller drainage pipe 46 is affixed within the interior of hub 47. When second guide member 44 is positioned downward beyond abutment ridge 56, the outer rounded ends 39 are abutted against the interior annular wall 58 of hub 47. In this situation, depending on the particular make of closet flange 42 being bored, since flanges 42 and the inward extension of ridges 56 vary slightly from one manufacturer to another, a perfectly round or circular guide member 16 may actually function as a usable replacement for our short, elongated member 44, although this is a relatively rare occasion we feel it can not be counted on, and therefore our tiltable non-circular guide member 44 is preferred since it will function in all situations. As rotary power is supplied to reboring tool 10, cutting member 14 shaves away both ridge 56 and hub 47, also cutting away small drainage pipe 46 due to the inward extending length of blades 32 toward arbor 12. A plastic coupler and short length of pipe 46 may now be affixed exteriorly to the remaining small drainage pipe 46 remanent, in order to affix a new closet flange 42 at the proper elevation. Under normal and proper conditions, there is sufficient space between pipe 46 and any flooring thereabout to apply the necessary externally fitting coupler to extend the pipe 46 upward.

Figure 13:
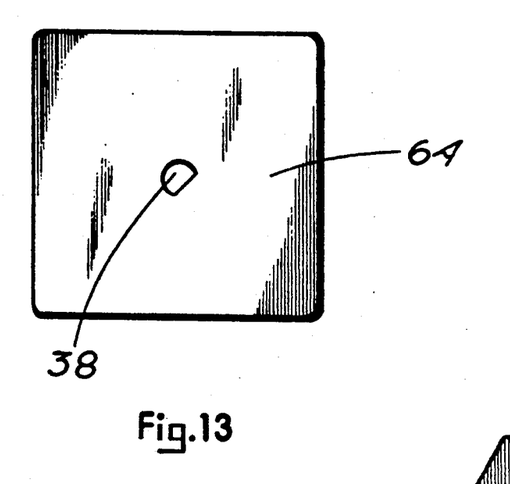
FIG. 13 is an example of another non-circular shape of centering guide member which will function suitably within the boundaries of our invention.
Figure 14:
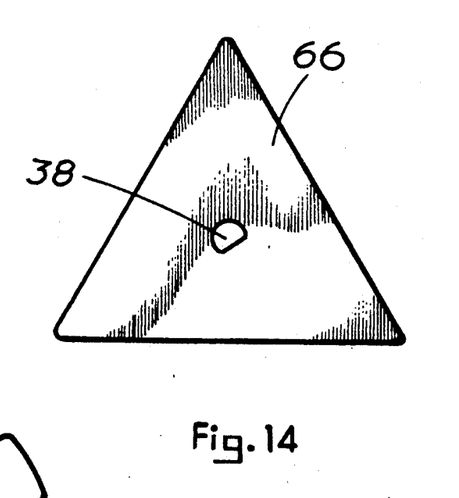
FIG. 14 is an example of another non-circular shape of centering guide member which will function suitably within the boundaries of our invention.
Figure 15:
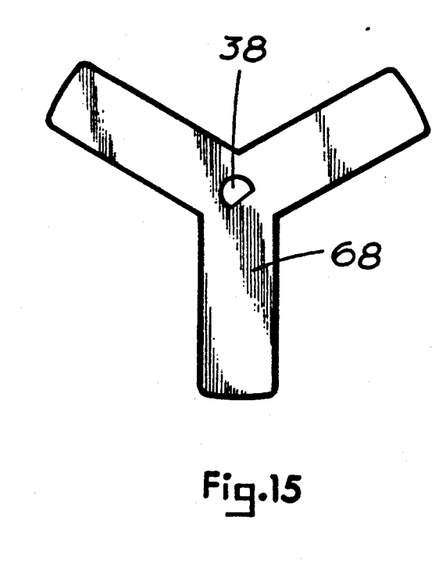
FIG. 15 is an example of yet another, but certainly not the final non-circular shape of centering guide member which will function suitably within the boundaries of the invention.

Although guide member 16 has been described and illustrated as a non-circular elongated plate, it can conceivably be structured in just about any non-circular shape that allows passage of guide member 16 through the narrow bore formed by ridge 56. Guide member 16 can therefore be a semi-circular member, the square embodiment 64 of FIG. 13, the triangular embodiment 66 of FIG. 14, or a star shape such as the three pointed star embodiment 68 of FIG. 15 for example. Some of these anticipated non-circular guide members 16 such as embodiment 68 require a combination of both steep angling and rotating to work or thread the guide member through the narrowed mouth at the top end of hub 47 of closet flange 42, a process which requires additional time consuming manual manipulation.

Other similar modifications and alterations are anticipated which are not illustrated in the drawings or described in the specifications, such as a single cutting blade 32 in cutting member 14. Obvious modifications such as this are considered to be incorporated into the scope of this invention, being limited only by the scope and spirit of our appended claims.

What we claim as our invention:

1. A reboring tool for removing, by guided rotary cutting action, a plastic closet flange affixed to a plastic drainage pipe, said reboring tool comprising;

an elongated arbor having a first end and an oppositely disposed second end, said second end having means for affixment to a rotatable chuck of a tool;

a non-circular guide member affixed on said arbor adjacent said first end thereof;

a cutting member having at least one cutting blade thereon, said cutting member having an aperture therethrough, said arbor positioned within said aperture of said cutting member, said cutting member positioned on said arbor between said guide member and said second end of said arbor;

a fastening means to prevent movement of said guide member upward and downward along said arbor;

a releasable fastening means to prevent movement of said cutting member upward and downward along said arbor;

selective placement means allowing selective movement of said cutting member towards and away from said first end of said arbor and said guide member with said releasable fastening means in a released state;

anti-rotation means preventing rotation of said cutting member independently of said arbor on at least a portion of said arbor.

2. A reboring tool according to claim 1 wherein said arbor includes threads and an elongated planar surface extending lengthwise with the length of said arbor at said first end of said arbor, said planar surface providing said first end of said arbor with a D-shaped cross section.

3. A reboring tool according to claim 1 wherein said non-circular guide member is an elongated flat bar having two oppositely disposed rounded ends.

4. A reboring tool according to claim 1 wherein said non-circular guide member affixed on said arbor is removably affixed.

5. A reboring tool according to claim 1 wherein said cutting head is a concavo-convex shaped disc having a centrally positioned D-shaped said aperture, and having a plurality of said cutting blades, and further formed of a single piece of metal.

6. A reboring tool according to claim 1 wherein said fastening means to prevent movement of said guide member upward and downward along said arbor includes in combination; threads on said arbor, an aperture in said guide member, and two nuts on said arbor, one of said two nuts on each side of said guide member and engaged with said threads of said arbor.

7. A reboring tool according to claim 1 wherein said releasable fastening means to prevent movement of said cutting member upward and downward along said arbor includes in combination; threads on said arbor, an aperture in said cutting member, and two nuts on said arbor, one of said two nuts on each side of said guide member and engaged with said threads of said arbor.

8. A reboring tool according to claim 1 wherein said selective placement means allowing selective movement of said cutting member towards and away from said first and of said arbor and said guide member with said releasable fastening means in a released state includes said aperture in said cutting member sufficiently large enough to allow sliding of said cutting member along said arbor.

9. A reboring tool according to claim 1 wherein said anti-rotation means preventing rotation of said cutting member independently of said arbor on at least a portion of said arbor includes said aperture in said cutting member being D-shaped, and said first end of said arbor being correspondingly D-shaped and fitting in close proximity within said D-shaped aperture.

* * * * *